(12) United States Patent
Fortier et al.

(10) Patent No.: US 12,377,968 B2
(45) Date of Patent: *Aug. 5, 2025

(54) AIRCRAFT LANDING GEAR WITH A MOTORIZED WHEEL SELECTIVELY POSITIONABLE RELATIVE TO A LANDING GEAR STRUT

(71) Applicant: SAFRAN LANDING SYSTEMS, Velizy-Villacoublay (FR)

(72) Inventors: Florent Fortier, Moissy-Cramayel (FR); Sébastien Dubois, Moissy-Cramayel (FR); Philippe Henrion, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/565,017

(22) PCT Filed: May 25, 2022

(86) PCT No.: PCT/EP2022/064336
§ 371 (c)(1),
(2) Date: Nov. 28, 2023

(87) PCT Pub. No.: WO2022/248627
PCT Pub. Date: Dec. 1, 2022

(65) Prior Publication Data
US 2024/0199202 A1 Jun. 20, 2024

(30) Foreign Application Priority Data
May 28, 2021 (FR) ...................... 2105575

(51) Int. Cl.
*B64C 25/32* (2006.01)
*B64C 25/00* (2006.01)

(52) U.S. Cl.
CPC ...... *B64C 25/405* (2013.01); *B64C 2025/008* (2013.01)

(58) Field of Classification Search
CPC ....... B64C 25/405; B64C 25/20; B64C 25/22; B64C 25/24; B64C 25/34; B64C 25/36;
(Continued)

(56) References Cited

U.S. PATENT DOCUMENTS

| 3,762,670 A | 10/1973 | Chillson |
| 2015/0136902 A1 | 5/2015 | Green et al. |

(Continued)

FOREIGN PATENT DOCUMENTS

| EP | 1 106 501 A1 | 6/2001 |
| EP | 3 002 213 A1 | 4/2016 |

(Continued)

OTHER PUBLICATIONS

International Search Report mailed Jul. 11, 2022, issued in corresponding International Application No. PCT/EP2022/064336, filed May 25, 2022, 6 pages.

(Continued)

*Primary Examiner* — Arfan Y. Sinaki
(74) *Attorney, Agent, or Firm* — CHRISTENSEN O'CONNOR JOHNSON KINDNESS PLLC

(57) ABSTRACT

An aircraft has an upper portion and a lower portion provided with a first and second axle. The first axle is provided with a braked wheel and the second axle is provided with a motorized wheel. A landing gear of the aircraft includes a main arm pivoting with respect to the strut on which the first axle is fixed. The second axle is fixed on the strut, and a main actuator moves the first axle between a remote position and a close position with respect to the upper portion. In the close position, the braked and motorized wheels are simultaneously in contact against a running plane, and in the (Continued)

remote position, the braked wheels are in contact against the running plane while the motorized wheel is at a distance from the running plane.

10 Claims, 5 Drawing Sheets

(58) Field of Classification Search
CPC ......... B64C 25/40; B64C 25/42; B64C 25/60; B64C 2025/008; B64C 2025/345
See application file for complete search history.

(56) References Cited

U.S. PATENT DOCUMENTS

| | | | |
|---|---|---|---|
| 2016/0096620 A1* | 4/2016 | Kracke | B64C 25/34 244/50 |
| 2019/0127053 A1* | 5/2019 | Ravel | B64C 25/405 |
| 2023/0234700 A1* | 7/2023 | Dubois | B64C 25/34 301/6.2 |

FOREIGN PATENT DOCUMENTS

| | | |
|---|---|---|
| FR | 3 072 943 A1 | 5/2019 |
| GB | 560316 A | 3/1944 |

OTHER PUBLICATIONS

Written Opinion mailed Jul. 11, 2022, issued in corresponding International Application No. PCT/EP2022/064336, filed May 25, 2022, 6 pages.

\* cited by examiner (LANDING)

(TAXI)

(TAKE-OFF at MTOW)

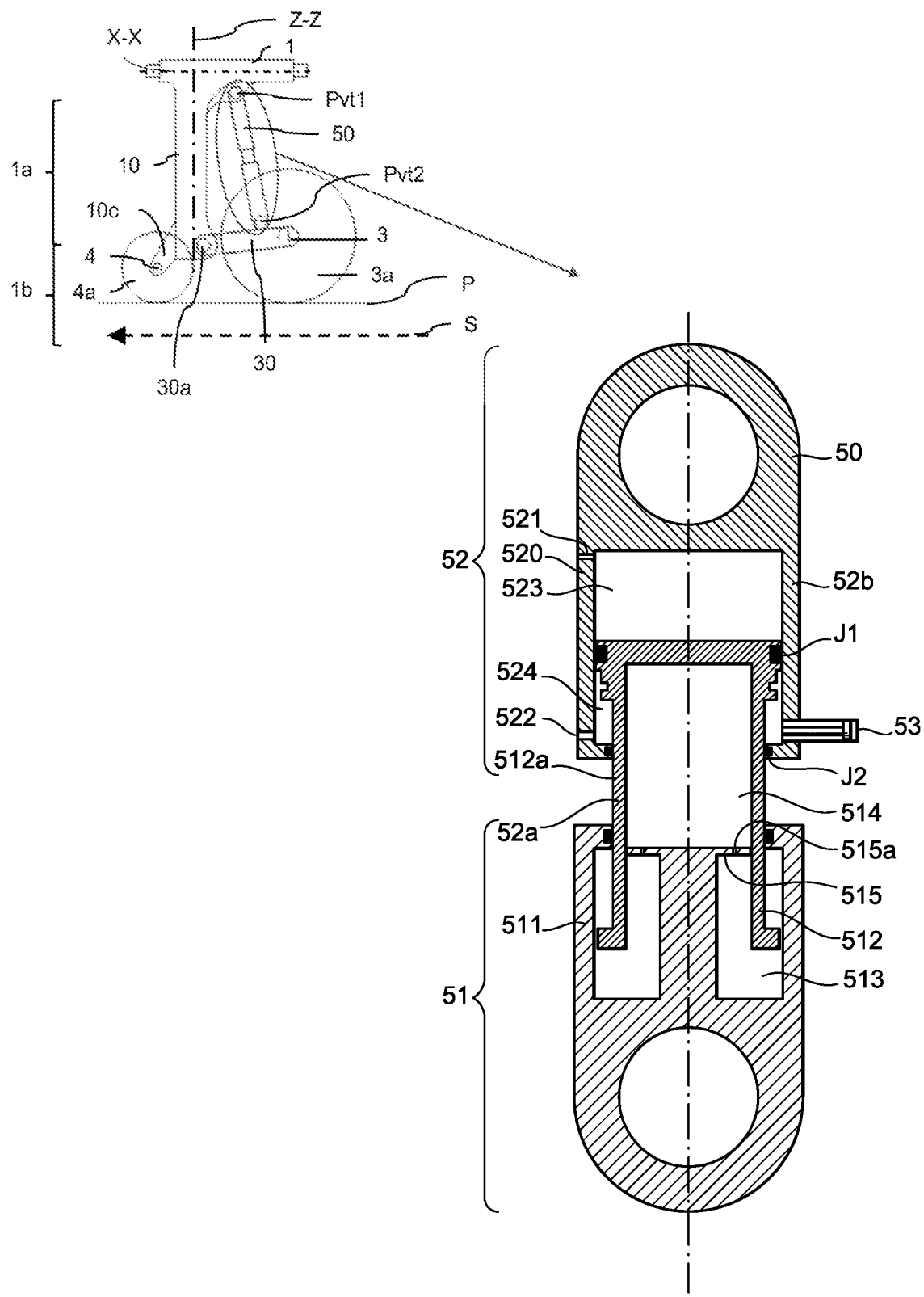

AIRCRAFT LANDING GEAR WITH A MOTORIZED WHEEL SELECTIVELY POSITIONABLE RELATIVE TO A LANDING GEAR STRUT

The present disclosure relates to the field of aircraft landing gears provided with at least one motorized wheel and at least one braked wheel.

FIELD OF THE DISCLOSURE

Patent document FR3072943A1 describes a landing gear provided with an upper portion intended to be joined to a structure of the aircraft and a lower portion equipped with a bogie forming a beam and two axles carried at the ends of this bogie.

This landing gear comprises a strut connecting the upper portion and the lower portion. The two axles of the landing gear are perpendicular to the bogie.

The front axle is equipped with a plurality of braked wheels and the rear axle is equipped with at least one motorized wheel to enable the progression of the aircraft on the ground (taxiing).

Each motorized wheel is thus arranged to transmit moving forces to the ground and each braked wheel is arranged to transmit the braking forces to the ground.

A damper is connected on the one hand to the bogie and on the other hand to the strut to damp a pitching movement of the bogie with respect to the leg, the braked and motorized wheels being simultaneously moved during the pitching movement of the bogie with respect to the strut.

The distribution of ground forces between the braked wheels at the front and the motorized wheels at the rear is difficult to control with this single damper coupled to the bogie. As a result, each motorized wheel is likely to undergo significant accelerations/shocks during the take-off and landing phases, which requires taking significant margins relative to the dimensioning of the motorized wheels.

BACKGROUND

An object of the present disclosure is to propose a landing gear making it possible to limit the risk of damaging a motorized wheel at the time of the take-off and landing phases.

SUMMARY

To this end, the disclosure relates to an aircraft landing gear having an upper portion intended to be joined to a structure of the aircraft and a lower portion provided with first and second axles, the first axle being equipped with at least one braked wheel and the second axle being equipped with at least one motorized wheel, the landing gear comprising a strut having a upper end belonging to the upper portion of the landing gear and a lower portion belonging to the lower portion of the landing gear.

The landing gear according to the disclosure is essentially characterized in that it comprises a main arm mounted so as to pivot with respect to the strut via a pivot connection, the first axle being fixed to this main arm at a distance from the strut and the second axle being fixedly connected to the leg, the landing gear comprises a main actuator arranged to act on the main arm so as to move the first axle between a position remote with respect to the upper portion and a position close with respect to the lower portion, in the close position the braked and motorized wheels are arranged so as to be able to be simultaneously in contact with a running surface and in the remote position the braked and motorized wheels are arranged so that each braked wheel equipping the first axle can be in contact with the running surface while each motorized wheel equipping the second axle remains at a distance from this running surface.

For the understanding of the disclosure:
  a braked wheel is a wheel mechanically coupled with a brake to apply a torque opposing the rotation of this braked wheel with respect to the axle equipped with this braked wheel (in this case, the first axle); and
  a motorized wheel is a wheel mechanically coupled with an engine intended to selectively apply an engine torque rotating this motorized wheel with respect to the axle equipped with this motorized (in this case, the second axle).

With the landing gear according to the disclosure, the first axle equipped with one or more braked wheels is carried by the main arm which pivots relative to the landing gear strut under the effect of the main actuator.

Depending on the movement of the main arm with respect to the strut, one can simply either bring the braked and motorized wheels into contact with the ground running surface or move the motorized wheel away from this running surface so that only the braked wheel(s) is/are in contact with the running surface.

Thus, the main mechanical forces transmitted, via the strut, from the aircraft to the ground, pass via the only braked wheels carried by the first axle.

In addition, as long as the motorized wheel is not brought into contact with the ground, it belongs to a suspended part of the landing gear that is carried via the main arm.

Upon landing, the braked wheel is in contact with the ground and the motorized wheel is away from the ground, the main shocks and forces transmitted via the strut thus transiting via the first axle and the braked wheel(s) without ever passing through the second axle and the motorized wheel.

The motorized wheel is thus protected from many risks of failure and it can be dimensioned as accurately as possible to be able to transmit a predefined maximum motor torque within a predefined speed range.

It is thus possible to limit the mass of the motorized wheel to that which is just necessary.

Moreover, during all the taxi phases of the aircraft, the aircraft is at least carried by the braked wheel(s) equipping the first axle while each motorized wheel on the second axle can be selectively moved with respect to the running surface by moving the main arm under the effect of the main actuator.

As long as the taxiing conditions do not enable a contact of the motorized wheel on the running surface (for example, because the aircraft moves at a to high speed), a distance can be kept between the motorized wheel and the running surface, so that only one braked wheel stay into contact with the running surface.

When the taxiing conditions so allow, it can be decided to control the main actuator to put the running surface in contact with the motorized wheel(s) equipping the second axle in addition to the braked wheel(s) equipping the first axle.

The control delivered to the main actuator makes it possible to adjust the distribution of the forces applied to the ground via the strut between the portion of forces transiting via the first axle and the braked wheel(s) and the portion of forces transiting via the second axle and the motorized wheel(s) equipping this second axle.

Thus, by means of the disclosure, the forces applied to the motorized wheel can be adjusted via a control delivered to the main actuator.

Typically, during the landing, take-off or high-speed taxiing phases, each motorized wheel of the landing gear is kept away from the running plane to preserve these motorized wheels.

By means of the disclosure, the motorized wheel is then protected against accelerations or impacts of too high strength.

The disclosure also makes it possible to dispense with disengagement means of the motorized wheel with respect to the engine, since aircraft speed conditions can be chosen, required to bring the motorized wheel into contact with the ground.

The size of the motorized wheel can be adapted to the sole need of moving the aircraft (pulling or pushing the aircraft).

The motorized wheel/tyre assembly and the whole kinetic chain between this wheel and the engine is subjected to speeds and forces which are a lot lower than the braked wheels, which makes it possible to reduce the risks of damaging the motorized wheel.

Being able to distance the motorized wheel with respect to the running surface during braking phases, makes it possible to not degrade the braking performance.

It can also be considered that the movement of each at least one motorized wheel by the main actuator is synchronised with the aircraft speed, this synchronisation being able to occur with a relaxed precision with respect to the synchronisation precision normally required to manage a motorized wheel clutching with its engine.

The synchronisation/transmission error can be recovered by the flexibility and the sliding of the motorized wheel tyre.

Another advantage of the landing gear according to the disclosure is that it can be optionally installed on an existing aircraft landing gear that would have a first axle carried by a main arm that pivots relative to the strut.

In this case, it is sufficient to fix on a lower portion of the strut, a second axle equipped with a motorized wheel so that this motorized wheel can be selectively moved away from the running surface by varying, under the effect of the main actuator, the orientation of the main arm with respect to the strut.

To this end, a fastening interface of the second axle that is removable with respect to the strut could be used.

An fastening interface could, for example, take the form of a flange tightening a lower portion of the strut, this strap being able to come into contact and possibly be fixed against a pivot pin serving as a pivot connection between the main arm and the strut.

Alternatively, the strut may include a forged portion in a structural part of the strut to form a radial protrusion of the strut arranged to assemble the second axle thereto.

Preferably, the first axle is exclusively equipped with braked wheel and does not support any motorized wheel.

Preferably, the second axle is exclusively equipped with a motorized wheel and does not support any braked wheel.

According to a second aspect, the disclosure also relates to an aircraft comprising at least one landing gear according to any one of the landing gear embodiments according to the disclosure.

This aircraft is arranged to selectively adopt first and second aircraft configurations, distinct from one another.

In the first aircraft configuration, the at least one braked wheel on the first axle and the at least one motorized wheel on the second axle are simultaneously in contact with a running surface to enable the taxiing of the aircraft.

In the second aircraft configuration, the at least one braked wheel on the first axle is in contact with the running surface while the at least one motorized wheel on the second axle is away from this running surface, the passage of one of these aircraft configurations to the other of these aircraft configurations being done by actuation of the main actuator.

The aircraft according to the disclosure benefits from the advantages associated with the landing gear according to the disclosure.

DESCRIPTION OF THE DRAWINGS

Other characteristics and advantages of the disclosure appear clearly from the following description that is given by way of non limiting indication and with reference to the accompanying drawings, in which:

FIG. 2c is a side view of the landing gear 1 according to the disclosure, associated with a longitudinal cross-section of the main actuator 50 while the landing gear 1 is in taxi configuration (in a speed range which is compatible with the motorized wheel use to move the aircraft), i.e. a low speed, in this configuration, each motorized wheel 4a and each braked wheel 3a is in contact with the running surface P, the damper 51 of the main actuator 50 is here more strongly compressed than in FIG. 2b because the landing gear is at maximum static load, in this case the damper 51 is here compressed to 85% of its maximum stroke of damping so as to maintain an additional damping stroke of 15% of the maximum stroke;

FIG. 4 is a front view of a portion of the landing gear according to the disclosure illustrating a second connection mode between a motorized wheel 4a and the second axle 4, wherein the motorized wheel 4a and the engine are integrated to form a wheel engine, in this case the engine belonging to a propeller system assembly M1 which is included in the wheel 4a.

DETAILED DESCRIPTION

Figure 1A:
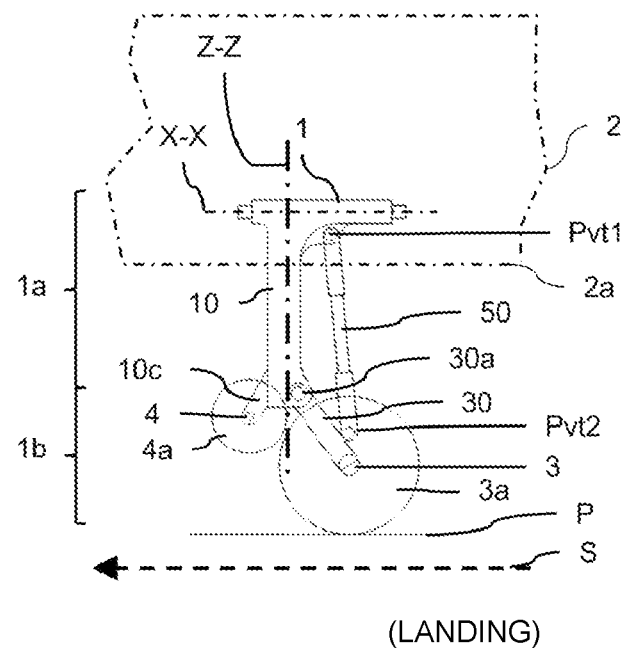
FIG. 1a is a side view of an aircraft portion 2 according to the disclosure, this aircraft comprising an aircraft structure zone 2a (illustrated as a dotted line only in this FIG. 1a) and a landing gear 1 according to the disclosure, an upper portion 1a of which is movably joined to this structure zone 2a, the landing gear 1 is, in this case, in a landing gear configuration where each braked wheel is in contact with the running surface P of the ground and in a remote position from the upper portion 1a of the landing gear, each motorized wheel 4a being at a distance from the running surface P, the aircraft is, in this case, in the so-called "landing" phase.

The landing gear according to the disclosure is substantially illustrated by FIGS. 1a, 1b, 1c, 2a, 2b, 2c which show different configurations adopted by the landing gear 1 during its use.

The landing gear 1 of the aircraft 2 comprises an upper portion 1a intended to be joined to a structure 2a of the aircraft 2 and a lower portion 1b provided with first and second axles 3, 4.

As illustrated in FIGS. 1a to 2c, the landing gear 1 according to the disclosure is preferably a main landing gear of the aircraft.

Such a landing gear is arranged to selectively adopt a retracted configuration, wherein it is placed in a zone of the structure 2a of the aircraft 2 and a deployed configuration, where it extends under the aircraft 2 in order to be able to support it and enables it to taxi over the running surface P.

For this end, the landing gear may be connected to the structure 2a of the aircraft via a main pivot axis X-X of the landing gear, substantially parallel to the usual movement direction S of the aircraft.

Alternatively, the landing gear according to the disclosure could be connected to the structure 2a of the aircraft 2 via any other connection mechanism conventionally used.

The landing gear also comprises an operating cylinder (not shown) to control the passage of the landing gear (in this case, by pivoting the landing gear about the axis X-X) between its retracted configuration and its deployed configuration.

The first axle 3 is, in this case, a rear axle and the second axle 4 is, in this case, a front axle with respect to a usual movement direction S of the aircraft 2.

The first axle 3 is always equipped with two braked wheels 3a and the second axle 4 is always equipped with one motorized wheel 4a.

Each braked wheel 3a is adapted to taxi over the running surface P and thus, on the one hand, support a portion of the weight of the aircraft 2 during landing, during the taxiing of the aircraft and during the take-off and, on the other hand, transmit a braking force of the aircraft when a brake associated with a braked wheel is actuated.

Each motorized is adapted to transmit a moving force of the aircraft (force causing the movement of the aircraft) when the motorized wheel is put in contact with the surface P and when the engine associated with this motorized wheel 4a is activated.

These first and second axles 3, 4 are parallel to one another, such that each wheel 3a on the first axle can rotated about a main axis of the first axle 3 and that each wheel 4a on the second axle 4 can rotate about a main axis of the second axle, these main axes of the first and second axles 3, 4 being parallel to one another.

The landing gear 1 comprises a strut 10, an upper end of which belongs to the upper portion 1a of the landing gear 1 and a lower end of which belongs to the lower portion 1b of the landing gear.

The landing gear 1 also comprises a main arm 30 which is pivotably mounted with respect to the strut 10 via a pivot which is in this case located close to the lower end of the strut 10.

This main arm 30 is pivotably mounted with respect to the strut 10 to only enable a pitching movement of this main arm 30.

It should be noted that a pitching movement is a movement of rotation about a transverse axis of the landing gear.

The first axle 3 is fixed to the main arm 30, at a distance from the strut 10.

The landing gear 1 comprises a main actuator 50 arranged to move the second axle 3 between a remote position and a close position with respect to the upper portion 1a while the second axle stay stationary with respect to the upper portion of the landing gear.

In the remote position shown in FIG. 1a, each wheel 3a on the first axle 3 is positioned to be able to be in contact with the running surface P while each wheel 4a on the second axle 4 is positioned to remain at a distance from this surface P.

Figure 1B:
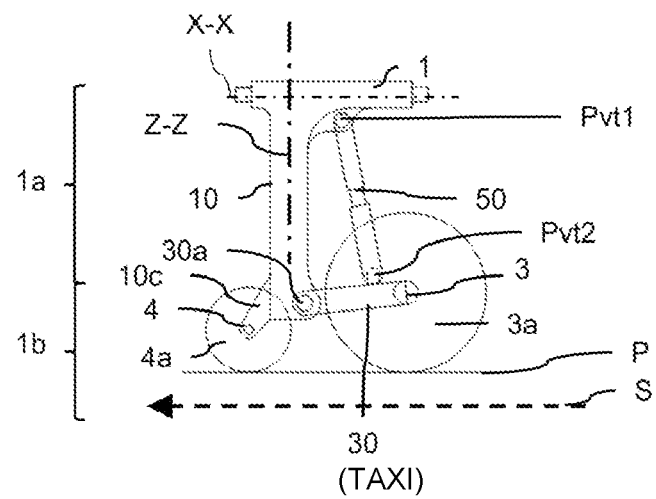
FIG. 1b is a side view of the landing gear 1 according to the disclosure while it is in a taxi configuration where each of the motorized 4a and braked 3a wheel(s) is in contact with the running surface P, the aircraft is, in this case, in the first aircraft configuration in the so-called "taxi" phase.
Figure 1C:
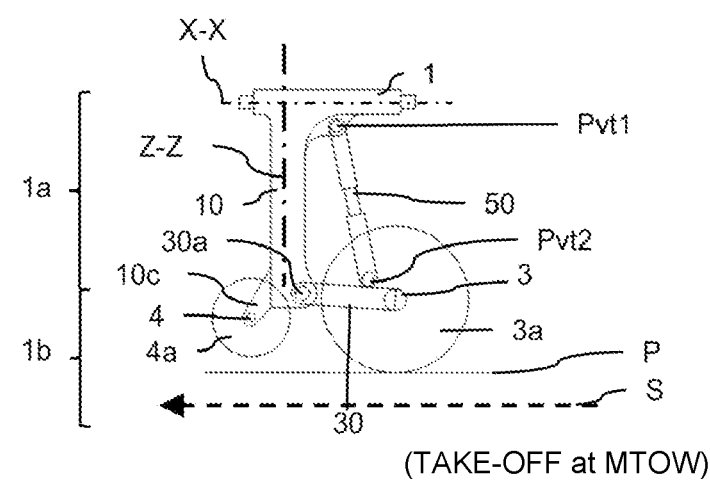
FIG. 1c is a side view of the landing gear 1 according to the disclosure which is in the take-off configuration where each motorized wheel 4a is away from the running surface P while each braked wheel is in contact with the surface P to support the aircraft, the aircraft is, in this case, in the second aircraft configuration in the so-called "take-off" phase.

In the close position shown in FIG. 1b, the wheels 3a, 4a which equip the first and second axles 3, 4 are positioned to be simultaneously in contact with the running surface P.

In other words:
when the first axle is in the remote position, the distance between the first axle and the upper portion of the landing gear is greater than the distance between the second axle 4 and the upper portion 1a, in contrast;
when the first axle is in the close position, the distance between the first axle and the upper portion of the landing gear is less than the distance between the second axle 4 and the upper portion 1a.

The main actuator 50 is, on the one hand connected (via a first pivot connection Pvt1) to the strut 10 and on the other hand, connected (via a second pivot connection) to the main arm 30 to, on the one hand control the orientation of the main arm 30 with respect to the strut 10 and on the other hand, dampen the pivot movement of this main arm 30 with respect to the strut 10 and thus dampen movements of the first axle 3 with respect to the strut 10.

Thus, the movement of the first axle 3 with respect to the strut 10 is damped by the damper 51 of the main actuator 50.

Therefore, as long as the first axle is in its remote position with respect to the upper portion of the landing gear 1a, the strut 10, the second axle 4 and the motorized wheel 4a equipping this second axle 4 belong to a suspended and damped part of the landing gear.

The equipment which is fixed to the suspended portion is thus protected from vibrations/shocks caused during the landing.

The second axle 4 is rigidly fixed to the strut 10 in greater proximity to the lower end of the strut than to the upper end of the strut 10.

In the present example, the lower end of the strut has a portion 10c radially offset from a longitudinal axis z-z of the strut 10.

This radially offset part 10c extends on the front side of the strut in the direction S of movement of the aircraft and the second axle 4 is fixedly mounted on this radially offset part of the strut 10.

In this way, the motorized wheel 4a is offset towards the front of the landing gear while the braked wheels 3a are offset towards the rear of the landing gear.

The part 10c of the strut 10 is preferably a forged part of the strut 10 and the second axle 4 is rigidly fixed to this part 10c of the strut 10 to guarantee its parallelism between the axles 3 and 4.

Preferably, these braked wheels 3a are arranged on either side of the main arm 30.

To simplify the side views of the landing gear according to the disclosure illustrated in FIGS. 1a, 1b, 1c, 2a, 2b, 2c, the braked wheel 3a normally concealing the main arm 30 has been omitted.

It must be noted that the number of braked wheels 3a and their arrangements on the first axle 3 could vary without moving away from the scope of the present disclosure.

In the embodiment shown in FIGS. 1a to 2c, the second axle 4 is equipped with a single motorized wheel 4a.

It can however be considered that this second axle 4 is equipped with several motorized wheels, the number and the arrangement of which could vary without moving away from the scope of the disclosure.

In particular, there could be two motorized wheels respectively placed on either side of the strut 10.

The strut 10, the main arm 30 and the main actuator 50 may each extend along axes which may be longitudinal and which are specific to them.

Figure 3:
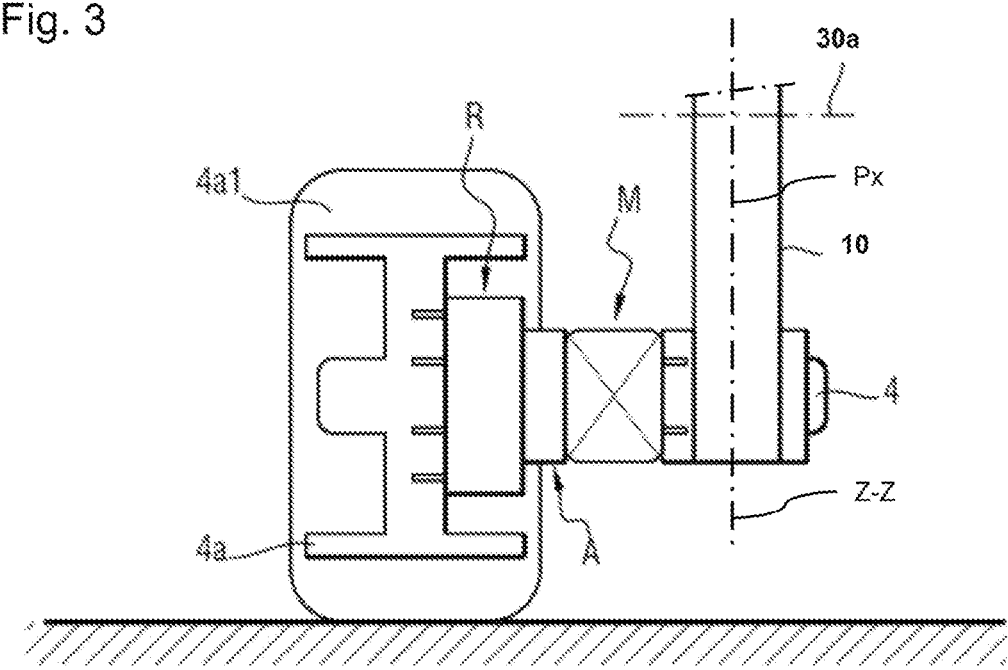
FIG. 3 is a front view of a portion of the landing gear according to the disclosure illustrating a first connection mode between a motorized wheel 4a and the second axle 4, wherein the motorized wheel 4a is connected to the engine M which drives it via a transmission impact damper A (this type of damper with tangential springs makes it possible to filter certain variations in the transmission torque between the engine and the motorized wheel 4a) and via a speed reducer R transmitting the torque of the engine M to the wheel 4a so as to rotate it with a rotation speed less than the rotation speed of the engine M.
Figure 4:
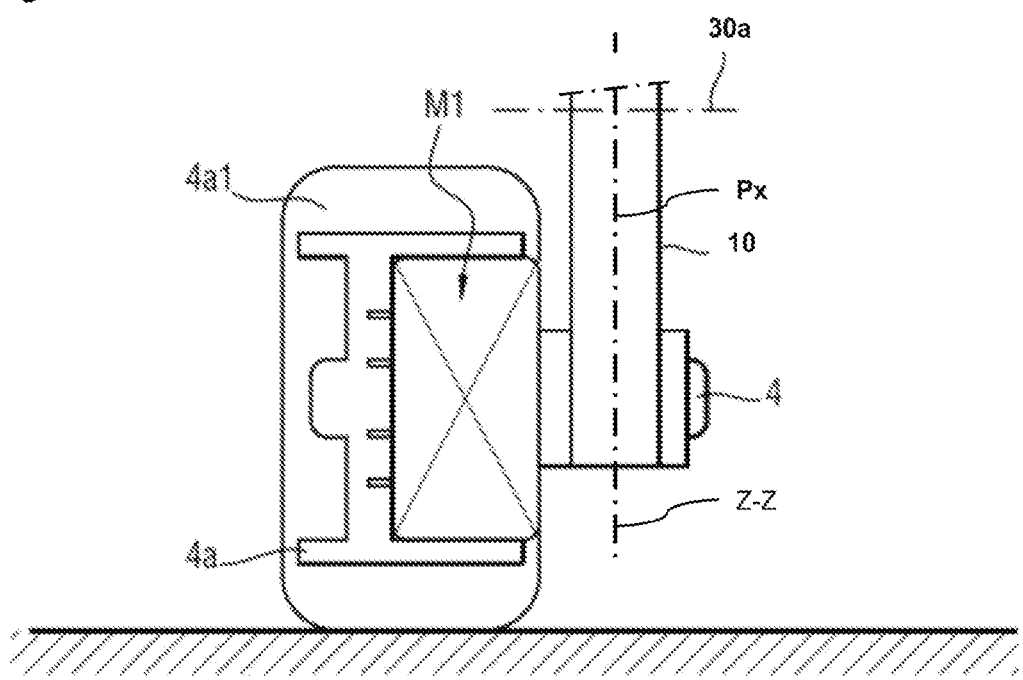

These axes may be coplanar with each other and lie in a main plane of symmetry Px of the landing gear (this plane Px is illustrated in FIGS. 3 and 4). Alternatively, these axes may be parallel to the main plane of symmetry Px of the landing gear without being coplanar.

The pivot connections 30a, Pvt1 and Pvt2 form simple (non-slip) pivots along respective pivot directions that are parallel to each other and perpendicular to the main plane of symmetry Px.

To improve running stability and avoid the risk of interaction between the braked wheels 3a and the motorized wheels 4a, the motorized wheel(s) 4a carried by the second axle 4 are preferably positioned between and at a distance from planes, parallel to one another, in which the braked wheels 3a extend.

In the embodiment of FIGS. 3 and 4, in which the landing gear comprises a single motorized wheel 4a, the latter is offset with respect to the main plane of symmetry Px of the landing gear.

Preferably, each motorized wheel 4a is on the outer side of the aircraft with respect to the main plane of symmetry Px of the landing gear 1.

Each motorized wheel 4a is generally associated with an engine M which corresponds to it and which enables its drive, but it can also be considered that a motorized wheel is driven by several engines or conversely, that one same engine drives several motorized wheels.

Preferably, the engine for driving a motorized wheel 4a is an electric engine M powered by an electric power unit belonging to the aircraft.

As illustrated in FIG. 3, an engine M can be mounted outside of the motorized wheel 4a with a kinetic chain between the engine M and the wheel 4a which is fully supported by the second axle 4, the engine M being located at a distance from the wheel 4a, between the strut 10 and the wheel 4a.

Alternatively, as illustrated in FIG. 4, the engine can be integrated with the wheel. In this embodiment, the engine belongs to a propeller system assembly M1 mainly placed in the wheel 4a, at a distance from the tyre 4a1.

Figure 2A:
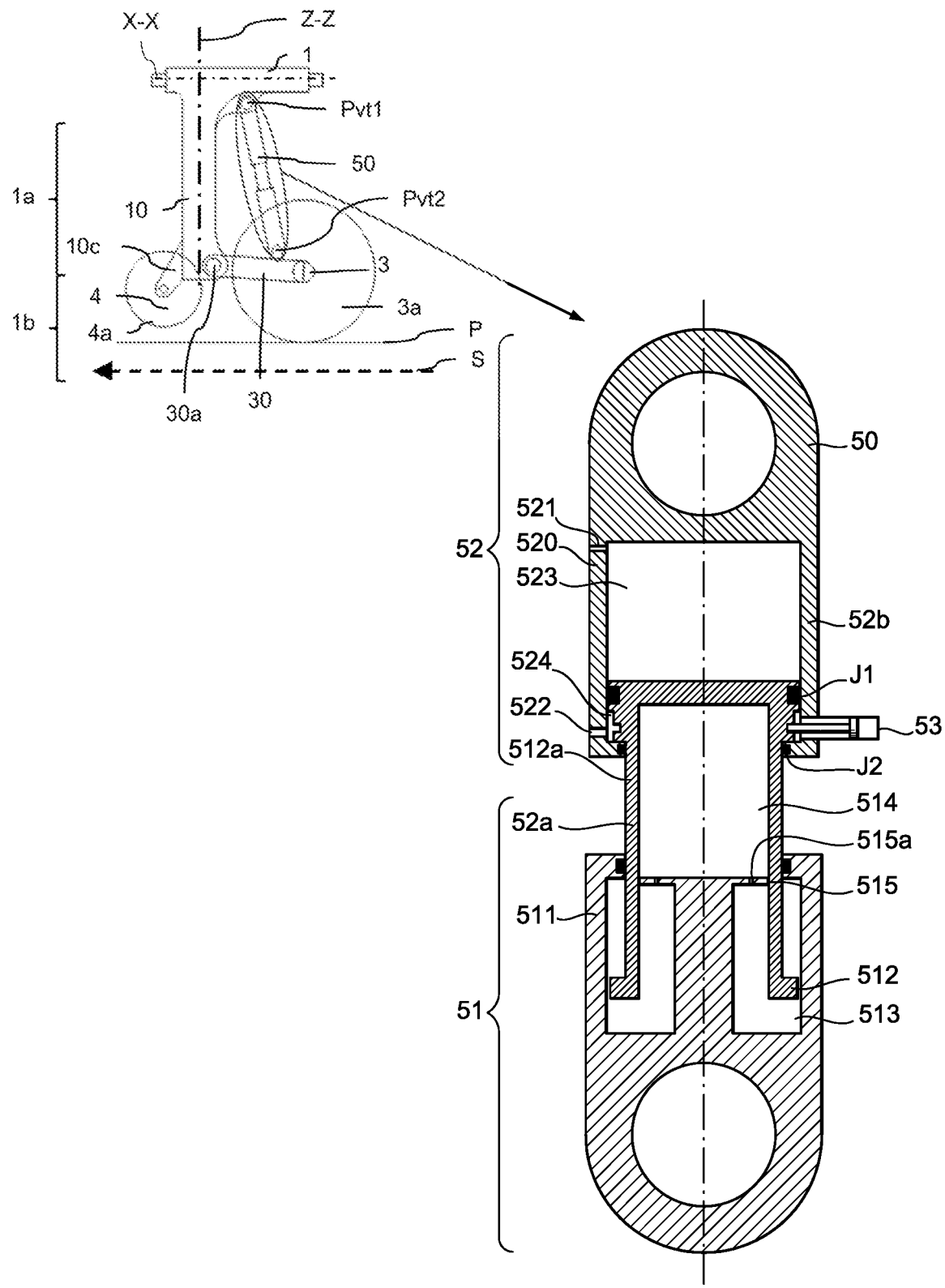
FIG. 2a is a side view of the landing gear 1 according to the disclosure, associated with a longitudinal cross-section of the main actuator 50 while the landing gear is in the landing configuration where only the braked wheels 3a are put in contact with the running surface P while each motorized wheel 4a is away from this surface P.
Figure 2B:
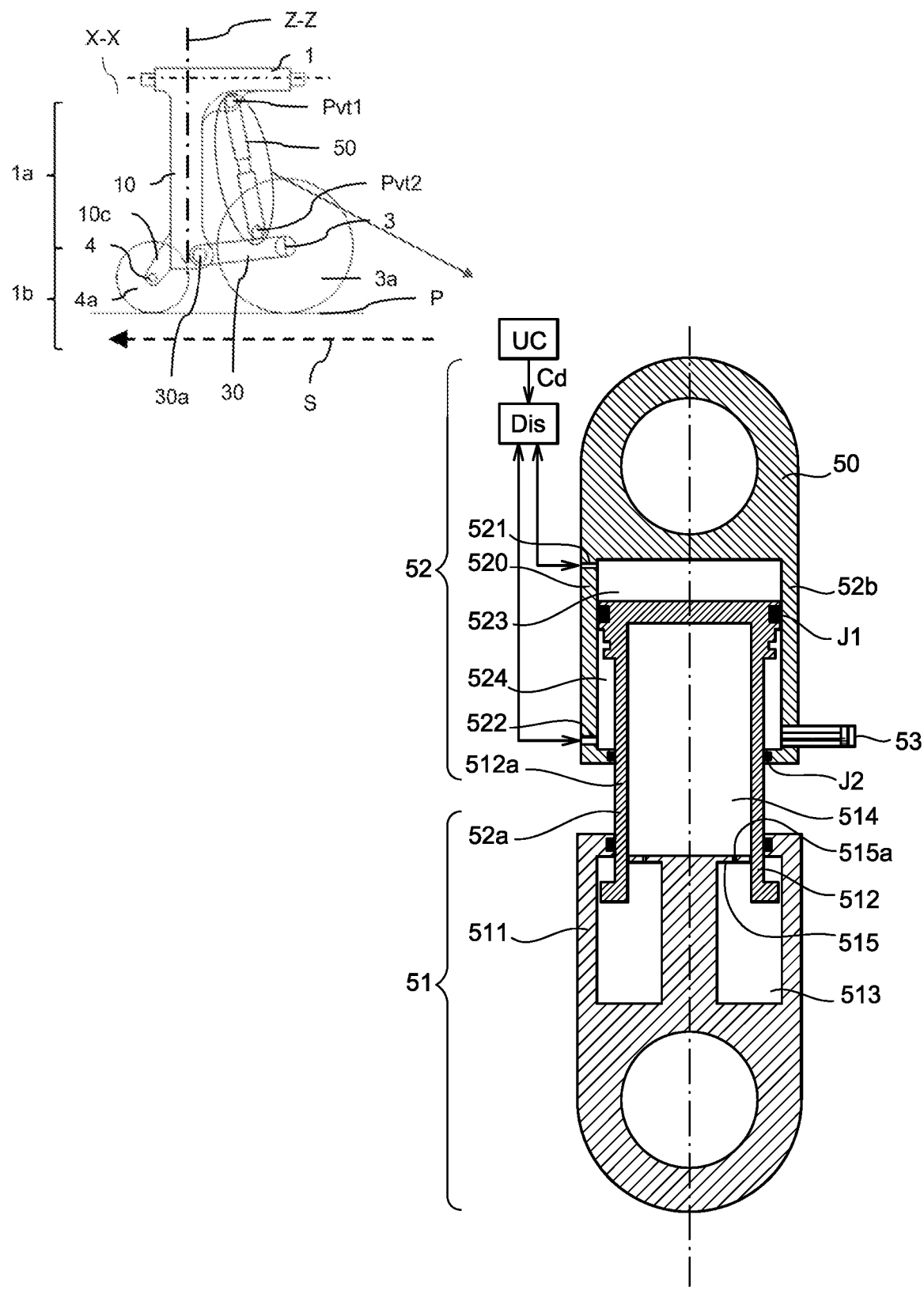
FIG. 2b is a side view of the landing gear 1 according to the disclosure, associated with a longitudinal cross-section of the main actuator 50 while the landing gear 1 is in a taxi configuration (in a speed range which is compatible with the motorized wheel use to move the aircraft), in this configuration, each motorized wheel 4a and each braked wheel 3a is in contact with the running surface P and the damper 51 of the main actuator 50 is extended, slightly compressed in a range from 15 to 40% of its maximal dampening stroke, the landing gear being in minimum static load.

As shown in FIGS. 2a to 2c, the main actuator 50 comprises a first damper 51 interposed between the main arm 30 and to the strut 10 so as to dampen a pivot movement of the main arm 30 with respect to the strut 10.

As is understood from FIGS. 2a to 2c, this first damper 51 is provided with first and second parts 511, 512 slidingly mounted against one another and together defining first and second damper chambers 513, 514 which are separated from one another by a movable wall 515 of the first damper 51.

This movable wall 515 is, in this case, defined by a portion of the first sliding part 511 which forms a piston sealingly sliding in a cylinder 512a defined in the second part 512.

A peripheral seal of this piston 515 can be in contact all around this piston in the cylinder 512a defined in the second part 512.

These first and second chambers 513, 514 of the first damper 51 have respective internal volumes which vary according to a sliding position of the movable wall 515 of the damper with respect to the second sliding parts 512 of the first damper 51.

Alternatively, the movable wall 515 which delimits the two chambers 513, 514 could be defined by a portion of the second sliding part 512 which would form a piston sealingly sliding in a cylinder defined in the first part 511.

The movable wall 515 is equipped with at least one fitted passage connecting the chambers 513, 514 together to enable a passage of fluid from one of these chambers to the other of these chambers in order to dampen the movement of the first and second parts 511, 512 against one another).

The main actuator 50 also includes a linear telescopic actuator 52 of variable length to vary the orientation of the main arm 30 relative to the strut 10 by rotating the main arm 30 about the pivot connection 30a relative to the strut 10.

The telescopic actuator 52 of the main actuator 50 is a hydraulic actuator provided with a first port 521 for the passage of hydraulic fluid.

The length of this actuator 52 is variable according to a volume of hydraulic fluid taken into this actuator 52 via this first port 521 for the passage of hydraulic fluid.

The telescopic actuator 52 of the main actuator 50 comprises a first actuator rod 52a and a first cylinder 52b.

The first actuator rod 52a is sealingly slidingly mounted in this first cylinder 52b so as to define a main chamber 523 in which the port 521 for the passage of hydraulic fluid leads.

This sealing is achieved by means of an annular seal J1 extending all around the first cylinder rod 52 a, in a groove of this first rod in order to achieve sliding sealing against an internal surface of the first cylinder 52b.

The first actuator rod 52a and the first cylinder 52b together defining a secondary chamber 524 in which a second port for the passage 522 of hydraulic fluid leads.

The actuator has a passage formed between the secondary chamber 524 and a zone external to the actuator 52 through which the first rod 52a slides.

A second annular seal J2 can be fixed in an internal groove formed in this passage to seal against an annular surface of the first rod 52a to oppose the passage of fluid between the secondary chamber 524 and the zone external to the actuator via the passage through which the rod 52a passes and slides.

This telescopic hydraulic actuator 52 is a double-acting actuator of variable length between a minimum length and a maximum length.

The maximum length of the cylinder is determined in such a way that, even if the braked wheel is deflated, the motorized wheel always remains away from the running plane as long as the current length of the cylinder is maximum.

The first damper 51 is interposed between the rod of the telescopic actuator 52*a* and the main arm 30 in order to damp the displacement of the main arm 30 relative to the rod 52*a* of the actuator and thus damp the pivoting of this arm 30 relative to the strut 10 about the pivot 30*a*.

To this end, the rod 52*a* and the second part 512 of the damper may constitute a single part, thereby facilitating the connection between the actuator 52 and the damper 51.

The minimum length of the telescopic hydraulic actuator 52 is reached when the main actuator rod 52 is abutted against a first abutment formed inside the main chamber 523.

The maximum length telescopic hydraulic actuator 52 is reached when the main actuator rod is abutted against a second abutment formed inside the secondary chamber 524.

The increase in the length of this actuator 52 is achieved by intaking fluid to the main chamber 523 via the first port 521 and by backflow of fluid outside of the secondary chamber 524 via the second port 522.

The decrease in the length of this actuator 52 is achieved by intaking fluid to the secondary chamber 524 via the second port 522 by backflow of fluid outside of the main chamber 523 via the first port 521.

The aircraft 2 comprises a hydraulic circuit (not represented) provided with a conduit for supplying highly pressurised hydraulic fluid connected to a hydraulic pump and a conduit for returning low pressure fluid relative to the high pressure.

The aircraft 2 also comprises a hydraulic distribution system Dis connected to the first and second ports of the actuator 521, 522 and to the supply and return conduits to selectively adopt:

- at least one configuration for extending the length of the actuator 52 wherein the first port 521 is connected to the supply conduit and the second port 522 is either preferably connected to the return conduit, or connected to the first port 521; and
- at least one configuration for reducing the length of the actuator wherein the second port is connected to the supply conduit and the first port is connected to the return conduit.

According to a particular embodiment, it could be provided that the hydraulic distribution system Dis can adopt a configuration for immobilising the actuator, wherein the circulation of fluid via the first and second ports 521, 522 would be inhibited so as to prevent any length variation of the actuator 52.

When the actuator is controlled to prevent any length variation of the actuator 52, then the pivoting of the main arm 30 with respect to the strut is allowed only within a predefined damping stroke allowed by the damper 51.

This actuator 52 could also be a monostable actuator which, in the event of a hydraulic supply fault, for example in the event of a drop in hydraulic pressure in at least one of its chambers below a predefined minimum value, would force the passage of the first axle to its remote position relative to the upper portion 1*a* of the landing gear. In this way, in the event of a hydraulic failure, only the braked wheel could come into contact against the running surface, the motorized wheel being moved away from this surface and thus preserved.

To this end, the actuator of FIGS. 2*a*, 2*b*, 2*c* could be equipped with an elastic return means (not shown) exerting an elastic force forcing the extension of the actuator 52.

The elastic return means could comprise a spring arranged in the secondary chamber 524 to be elastically compressed therein in response to an extension of the actuator 52.

The telescopic jack 52 of the main actuator 50 may also comprise a locking system 53 shown schematically in FIGS. 2*a* to 2*c*.

The locking system 53 could comprise one or more locking segments or one or more locking claws.

This locking system 53 is arranged to selectively take a locked configuration and an unlocked configuration.

In its locked configuration, the telescopic actuator 52 of the main actuator 50 is blocked to keep the first axle 3 in its remote position with respect to the upper portion 1*a* of the landing gear.

In its unlocked configuration, the telescopic actuator 52 is released to be able to move the first axle 3 between its remote position with respect to the upper portion 1*a* of the landing gear and its close position with respect to the upper portion 1*a* of the landing gear.

This locking system 53 is arranged to pass from its locked configuration to its unlocked configuration in response to an unlocking control.

In the present case, the unlocking control consists of an increase in pressure of the hydraulic fluid taken in via the second port 522 for the passage of hydraulic fluid.

The locking system 53 is preferably arranged so that the passage from the unlocked configuration to the locked configuration takes place automatically during the extension of the telescopic actuator 52 when the actuator 52 has a running length equal to its maximum length.

The damper 51 of the main actuator 50 is shaped to exert a return force, forcing this damper 51 to return to an extended configuration of the damper 51. Thus, as soon as the braked wheel comes into contact against the running surface, the damper is compressed under the effect of the pivoting of the main arm and the movement of this arm is then damped.

The main actuator 50 is arranged so that when the motorized wheel 4*a* is in contact against the running plane, the damper 51 exerts an elastic force opposing the compression of the motorized wheel 4*a* against the running plane.

Thus, in order to increase the compression force of the motorized wheel 4*a* against the running plane P and thus increase the motor force that can be transmitted via the motorized wheel 4*a*, it suffices to retract the actuator 52 in order to reduce the damping force applied via the damper 51 to the main arm 30.

Conversely, in order to reduce the compression force of the motorized wheel 4*a* against the running surface P and thus preserve the motorized wheel 4*a* against a risk of overload, it suffices to extend the actuator 52 in order to increase the damping force applied by the damper 51 to the main arm 30.

The distribution of the forces supported by the strut 10 occurs between the braked wheel(s) equipping the first axle 3 and the motorized wheel(s) equipping the second axle 4 as a function of the force applied by the main actuator 50 on the main arm 30, this force itself being a function of the hydraulic pressure inside the main chamber 523 of the actuator 52.

The aircraft can also comprise a control unit UC of the landing gear which is connected to the hydraulic distribution system Dis to transmit a control Cd of the main actuator 50.

The main actuator 50 is preferably controlled via the control unit UC such that as long as the speed of the aircraft 2 is greater than a predetermined speed threshold, this main actuator 50 applies a force tending to keep the second axle 3 in its remote position with respect to the upper portion 1a of the landing gear 1.

Thus, as long as the speed of the aircraft is greater than the predetermined speed threshold, the motorized wheels 4a are necessarily away from the running surface P (ground) and only the braked wheel(s) 3a carried by the first axle 3 can come into contact with the running surface P.

The main actuator 50 is preferably controlled by the control unit UC so that when the speed of the aircraft is less than the predetermined speed threshold, the actuator 50 then applies a force tending to hold the first axle 3 in an intermediate position between its remote and close positions with respect to the upper portion 1a of the landing gear 1 so that the braked and motorized wheels can be simultaneously in contact against the running surface P to thus distribute forces transmitted via the strut to the motorized and braked wheels.

To this end, the control unit UC of the landing gear which is connected to the hydraulic distribution system Dis can be adapted to control the main actuator 50, in this case to control the actuator 52, so as to maintain it in a predetermined intermediate position in which the actuator 52 has a predetermined length in a range from the minimum length to the maximum length.

This predetermined intermediate length is calculated by a computer in order to limit the load applied via the strut to the motorized wheel below a predetermined maximum load value.

To this end, the control unit UC may be adapted to control a variation in the length of the telescopic actuator 52 and/or a variation in the damping coefficient of the damper 51 as a function of a measured value representative of a load applied by the main actuator 50 to the main arm 30 and/or as a function of a measured value representative of a current length of the damper 51 and/or as a function of a measured value representative of a current pressure in the motorized wheel and/or as a function of a measured value representative of a current pressure in the braked wheel and/or as a function of a current mass value of the aircraft to be supported by the landing gear.

Typically, the control for varying the length of the actuator 52 delivered by the control unit UC is such that when the braked and motorized wheels are simultaneously in contact with the running surface (during taxiing), then the vertical force applied to the running surface via the motorized wheel(s) 4a represents approximately 20%, within plus or minus 5%, of the total vertical force applied to the running surface via the braked wheel(s) 3a.

To do this, the length variation control of the actuator 52 can be calculated as a function of:
- a vertical stiffness $K_{act}$ of the motorized wheel 4a; and
- an overall vertical suspension stiffness of the landing gear $K_{susp}$ (including the respective stiffnesses of the tires of the braked wheels 3a, of the damper 51 and of the actuator 52, all in series), taking into account the geometry of the landing gear and a current mass of the aircraft.

By virtue of this control of the main actuator 50 by the control unit UC:

- when the aircraft is under a minimum static load (see FIG. 2b), the predetermined intermediate length of the actuator 52 is small so that the force applied by the damper 51 on the main arm 30 and consequently on the braked wheel is sufficiently small to ensure that the motorized wheel receives a sufficient load to ensure minimum adhesion to the ground; and
- when the aircraft is under maximum static load (see FIG. 2c), the predetermined intermediate length of the actuator 52 is large so that the force applied by the damper 51 on the main arm 30 and consequently on the braked wheel is sufficiently strong to ensure that the motorized wheel receives sufficient load to ensure minimum adhesion to the ground while ensuring that this load remains below a maximum load value tolerable by the motorized wheel.

As a result, when the aircraft is at minimum static load (OEW for Operating Empty Weight), as shown in FIG. 2b, the actuator 52 is maintained at an intermediate length/stroke necessary to place the motorized wheel 4a on the ground with a minimum force necessary for the adhesion of the tire.

The aircraft hydraulic pressure is used to retract the actuator. This minimum pressure level of pressure in the actuator must be maintained throughout taxiing.

This aircraft configuration corresponds for the actuator to a predetermined maximum depression, i.e. a minimum predetermined intermediate length value.

When the aircraft is at maximum static load (MTOW for Maximum Take-Off Weight), as shown in FIG. 2c, the actuator is controlled by the control unit UC to have a maximum predetermined intermediate length value so that the damper is in the compressed position at about 85% of its stroke under maximum load.

In this aircraft configuration, the necessary taxiing effort is significant. If necessary, the cylinder 52 is controlled in pressure to be in an intermediate position between the maximum stroke (at minimum aircraft load) and the locked position by the locking system 53 (the locked position is used during the landing phase in particular to ensure that when the braked wheel is in contact on the ground, the motorized wheel is then away from the ground).

The current length of the actuator is always chosen to ensure that sufficient adhesion of the motorized wheel 4a to the ground is maintained while avoiding overloading of this motorized wheel 4a.

It should be noted that the main actuator 50 could also comprise controlled adjustment means for varying the characteristics of the damper 51, such as its length and/or its stiffness, i.e. the characteristics of the damper.

For example, the variation in length and/or stiffness and/or damping of the main damper could vary according to the speed of the aircraft.

Thus, as long as the speed of the aircraft is greater than the predetermined speed threshold, this main actuator 50 could be controlled to apply a force on the main arm 30 tending to flatten the braked wheel 3a against the running surface P and to keep the strut 10 at a distance sufficiently away from the running surface P to guarantee that no motorized wheel 4a carried by the second axle 4 comes into contact with the running surface P.

However, when the speed of the aircraft 2 is less than the predetermined speed threshold, this main actuator 50 is controlled to flatten the motorized and braked wheels on the running surface P and thus adjust the distribution of the bearing forces of the aircraft, between the braked and motorized wheel(s).

In this manner, it can be guaranteed that at any moment during the taxiing of the motorized and braked wheels, each motorized wheel can transmit effective traction forces of the aircraft and that each braked wheel can support the aircraft, while transmitting effective braking forces.

Generally, thanks to the disclosure, during taxiing, each braked wheel 3 on the first axle remains in contact with the running surface, while the at least one motorized wheel on the second axle is selectively put into contact with the running surface P or away from this running surface P according to which the running taxiing speed is adapted, or not, to the operation of the motorized wheel.

Thanks to the disclosure:
the tyre of each braked wheel and the diameter of each braked wheel can be adapted to meet the needs associated with the landing, braking, and take-off phases; and
the tyre of each motorized wheel and the diameter of each motorized wheel can be adapted to meet the sole needs of moving the aircraft, during taxiing ranges outside of the landing, high-power braking, and take-off phases.

The invention claimed is:

1. A landing gear for an aircraft, the landing gear comprising:
an upper portion configured to be assembled to a structure of the aircraft;
a lower portion provided with first and second axles, a braked wheel being mounted to the first axle, and a motorized wheel being mounted to the second axle;
a strut having an upper end belonging to the upper portion of the landing gear and a lower end belonging to the lower portion of the landing gear;
a main arm pivotally mounted relative to the strut via a pivot connection, said first axle being fixed to the main arm at a distance from the strut, and the second axle being fixedly connected to the strut; and
a main actuator arranged and configured to act on the main arm to move the first axle between a remote position, in which the first axle is remote from the upper portion and a close position, in which the first axle is close to the upper portion,
wherein, in the close position, the braked wheel and the motorized wheel are arranged and configured to be in contact simultaneously against a running surface, and in the remote position, the braked wheel and the motorized wheel are arranged and configured so that the braked wheel is in contact against the running surface while the motorized wheel stays at a distance from the running surface.

2. The landing gear according to claim 1, wherein the main actuator comprises a first end connected to the strut via a first pivot and a second end connected to said main arm via a second pivot to pivot the main arm relative to the strut and thus move the first axle between the remote position and the close position, the main actuator further comprising a linear telescopic actuator of variable length to vary an orientation of the main arm with respect to the strut and a first damper interposed between the main arm and the strut to dampen a pivoting movement of the main arm relative to the strut.

3. The landing gear according to claim 2, wherein the main actuator further comprises a locking system selectively adopting a locked configuration and an unlocked configuration, wherein in the locked configuration, the telescopic actuator is blocked to keep the first axle in the remote position, and in the unlocked configuration, the telescopic actuator is released to move the first axle between the close position and the remote position.

4. The landing gear according to claim 3, wherein the locking system is arranged and configured to pass from the locked configuration to the unlocked configuration in response to an unlocking control.

5. The landing gear according to claim 2, wherein the telescopic actuator is a hydraulic actuator provided with a first port for passage of hydraulic fluid, the length of the hydraulic actuator being variable according to a volume of hydraulic fluid taken into the hydraulic actuator via the first port.

6. The landing gear according to claim 5, wherein the telescopic actuator comprises a first actuator rod and a first actuator, the first actuator rod being sealingly and slidingly mounted in the first actuator to define a main chamber in fluid communication with the first port.

7. The landing gear according to claim 6, wherein the first actuator rod and the first actuator together define a secondary chamber in fluid communication with a second port for passage of hydraulic fluid, the telescopic actuator of the main actuator being a double-acting actuator of variable length.

8. The landing gear according to claim 6, wherein the first damper is interposed between the first actuator rod and said main arm to damp movement of the main arm relative to the first actuator rod.

9. The landing gear according to claim 2, further comprising a control unit adapted to control a variation in length of the telescopic actuator as a function of a measured value representative of a load applied by the main actuator to the main arm and/or as a function of a measured value representative of a current length of the damper and/or as a function of a measured value representative of a current pressure in the motorized wheel and/or as a function of a measured value representative of a current pressure in the braked wheel and/or as a function of a current mass value of the aircraft to be supported by the landing gear.

10. An aircraft comprising the landing gear according to claim 1, the aircraft being arranged to selectively adopt first and second aircraft configurations, distinct from one another, wherein, in the first aircraft configuration, said braked wheel and said motorized wheel are simultaneously in contact with the running surface to enable taxiing of the aircraft, and in the second aircraft configuration, said braked wheel is in contact with the running surface while said motorized wheel is distanced from the running surface.

* * * * *